US011053975B2

(12) United States Patent
Imura et al.

(10) Patent No.: US 11,053,975 B2
(45) Date of Patent: Jul. 6, 2021

(54) SLIDING COMPONENT

(71) Applicant: EAGLE INDUSTRY CO., LTD., Tokyo (JP)

(72) Inventors: Tadatsugu Imura, Tokyo (JP); Ayano Tanishima, Tokyo (JP); Hideyuki Inoue, Tokyo (JP); Yuichiro Tokunaga, Tokyo (JP); Takeshi Hosoe, Tokyo (JP); Yuta Negishi, Tokyo (JP); Yuki Maetani, Tokyo (JP)

(73) Assignee: EAGLE INDUSTRY CO., LTD, Tokyo (JP)

( * ) Notice: Subject to any disclaimer, the term of this patent is extended or adjusted under 35 U.S.C. 154(b) by 0 days.

(21) Appl. No.: 16/610,844

(22) PCT Filed: May 15, 2018

(86) PCT No.: PCT/JP2018/018624
§ 371 (c)(1),
(2) Date: Nov. 4, 2019

(87) PCT Pub. No.: WO2018/212144
PCT Pub. Date: Nov. 22, 2018

(65) Prior Publication Data
US 2020/0158162 A1    May 21, 2020

(30) Foreign Application Priority Data

May 19, 2017   (JP) .............................. JP2017-099502

(51) Int. Cl.
*F16C 17/04*   (2006.01)
*F16C 33/10*   (2006.01)

(52) U.S. Cl.
CPC ........ *F16C 17/045* (2013.01); *F16C 33/1025* (2013.01)

(58) Field of Classification Search
CPC .......................... F16C 17/045; F16C 33/1025; F16C 33/1065; F16J 15/3412; F16J 15/3424
See application file for complete search history.

(56) References Cited

U.S. PATENT DOCUMENTS

| 4,789,250 A | 12/1988 | Schluter |
| 9,228,660 B2 | 1/2016 | Hosoe et al. |

(Continued)

FOREIGN PATENT DOCUMENTS

| CN | 101016949 A | 8/2007 |
| CN | 103090005 B | 4/2014 |

(Continued)

OTHER PUBLICATIONS

International Search Report (ISR) dated Jun. 26, 2018, issued for International application No. PCT/JP2018/018624. (2 pages).

(Continued)

*Primary Examiner* — Phillip A Johnson
(74) *Attorney, Agent, or Firm* — Law Office of Katsuhiro Arai (57) ABSTRACT

In an exemplary embodiment, a pair of sliding components has annular sliding surfaces that slide with respect to each other in which plural dimples 10 are arranged on at least sliding surface S on one side, wherein the plural dimples 10 are randomly arranged to form a random dimple group 11, and the dimples 10 are arranged in a manner that a radial-direction coordinate average of centers of the dimples 10 of the random dimple group 11 is smaller than a sliding radius 15 of the sliding surface S.

14 Claims, 6 Drawing Sheets

(56) References Cited

U.S. PATENT DOCUMENTS

| | | | |
|---|---|---|---|
| 9,494,239 B2 | 11/2016 | Hosoe et al. | |
| 9,829,043 B2 | 11/2017 | Inoue et al. | |
| 9,951,873 B2 | 4/2018 | Inoue et al. | |
| 9,970,478 B2 | 5/2018 | Inoue et al. | |
| 2003/0178781 A1* | 9/2003 | Tejima | F16J 15/3424 277/399 |
| 2003/0189294 A1* | 10/2003 | Tejima | F16J 15/3424 277/399 |
| 2011/0215531 A1* | 9/2011 | Tokunaga | F16J 15/3412 277/399 |
| 2011/0233872 A1 | 9/2011 | Iguchi et al. | |
| 2014/0167362 A1 | 6/2014 | Hosoe et al. | |
| 2015/0260292 A1 | 9/2015 | Inoue et al. | |
| 2016/0195139 A1 | 7/2016 | Inoue et al. | |
| 2017/0234431 A1 | 8/2017 | Katori et al. | |
| 2018/0017163 A1* | 1/2018 | Hosoe | F16C 33/1065 |
| 2018/0058502 A1* | 3/2018 | Hosoe | B23K 26/355 |
| 2018/0172162 A1 | 6/2018 | Tokunaga et al. | |
| 2019/0170257 A1 | 6/2019 | Hosoe et al. | |
| 2019/0264737 A1 | 8/2019 | Itadani | |
| 2019/0316682 A1 | 10/2019 | Negishi et al. | |
| 2020/0182356 A1 | 6/2020 | Itadani et al. | |
| 2020/0224722 A1 | 7/2020 | Imura et al. | |
| 2021/0054934 A1 | 2/2021 | Imura et al. | |

FOREIGN PATENT DOCUMENTS

| | | |
|---|---|---|
| CN | 203641506 U | 6/2014 |
| EP | 1350996 A2 | 10/2003 |
| EP | 3048341 A1 | 7/2016 |
| EP | 3627011 A1 | 3/2020 |
| JP | S631814 A | 1/1988 |
| JP | 2001221179 A | 8/2001 |
| JP | 2003343741 A | 12/2003 |
| JP | 2004003578 A | 1/2004 |
| JP | 2004162907 A | 6/2004 |
| JP | 4316956 B2 | 8/2009 |
| JP | 4557223 B2 | 10/2010 |
| JP | 2011185292 A | 9/2011 |
| JP | 5456772 B2 | 4/2014 |
| WO | 02093046 A1 | 11/2002 |
| WO | 2013031530 A1 | 3/2013 |
| WO | 2014112455 A1 | 7/2014 |
| WO | 2015041048 A1 | 3/2015 |
| WO | 2016035860 A1 | 3/2016 |
| WO | 2016129553 A1 | 8/2016 |
| WO | 2016143721 A1 | 9/2016 |
| WO | 2016203878 A1 | 12/2016 |
| WO | 2018043307 A1 | 3/2018 |
| WO | 2018070265 A1 | 4/2018 |
| WO | 2018088353 A1 | 5/2018 |
| WO | 2018092829 A1 | 5/2018 |

OTHER PUBLICATIONS

Extended European Search Report (EESR) dated Dec. 23, 2020, issued for European counterpart patent application No. EP18803055.5 (6 pages).

International Search Report (ISR) dated Sep. 25, 2018, issued for related International application No. PCT/JP2018/026251. (2 pages).

Non-Final Office Action issued by U.S. Patent and Trademark Office, dated Sep. 30, 2020, for a co-pending U.S. Appl. No. 16/626,838. (14 pages).

Extended European Search Report (EESR) dated Dec. 21, 2020, issued for related European patent application No. EP18802992.0 (6 pages).

Extended European Search Report (EESR) dated Feb. 17, 2021, issued for related European patent application No. EP18832266.3 (7 pages).

International Search Report (ISR) dated Jul. 10, 2018, issued for related International application No. PCT/JP2018/018623. (1 page).

* cited by examiner

Sliding radius $R_m = \dfrac{R_o + R_i}{2}$

SLIDING COMPONENT

CROSS-REFERENCE TO RELATED APPLICATIONS

This application is the U.S. National Phase under 35 U.S.C. § 371 of International Application PCT/JP2018/018624, filed May 15, 2018, which claims priority to Japanese Patent Application No. JP2017-099502, filed May 19, 2017. The International Application was published under PCT Article 21(2) in a language other than English.

TECHNICAL FIELD

The present invention relates to a sliding component suitable, for example, as a mechanical seal, a sliding bearing, and other sliding units. In particular, the present invention relates to a sliding component such as a seal ring or a bearing that requires reduction of friction by interposing a fluid between sliding surfaces, and prevention of leakage of the fluid from the sliding surfaces.

BACKGROUND ART

In a mechanical seal serving as an example of a sliding component, while maintaining a sealing property, sliding friction during rotation is required to be reduced to the extreme. By variously texturing the sliding surfaces, a method of reducing friction is realized. For example, as one of texturing, arrangement of dimples on the sliding surfaces is known.

Conventionally, in a case where dimples are provided on a sliding surface in order to meet contradictory conditions of sealing and lubricating, plural dimples are arranged and aligned in order in general. For example, in the invention described in JP 2003-343741 A (hereinafter, referred to as "Patent Document 1"), for the purpose of reducing a friction coefficient of a sliding surface and improving a sealing ability, plural thin and long dimples are provided and aligned in order in a regular manner on the sliding surface so that the inclination directions of the dimples are different between the outer peripheral side and the inner peripheral side with a border reference line X as a borderline. Leading ends in the rotation direction of the dimples on the outer peripheral side are inclined toward the outer peripheral side, and leading ends in the rotation direction of the dimples on the inner peripheral side are inclined toward the inner peripheral side.

Conventionally, in order to improve a lubricating property, random arrangement of plural dimples is also known. For example, in the invention described in JP 2001-221179 A (hereinafter, referred to as "Patent Document 2"), plural dimples are randomly arranged on an inner wall of a cylinder of a rotary compressor and a leading end surface and both side end surfaces of a sliding vane.

CITATION LIST

Patent Documents

Patent Document 1: JP 2003-343741 A
Patent Document 2: JP 2001-221179 A

SUMMARY OF THE INVENTION

Technical Problem

However, in the invention described in Patent Document 1, since the dimples are arranged and aligned in order, an effect of suctioning from the leakage side to the sliding surface and an effect of flowing from the sealed fluid side to the sliding surface are low. Thus, there is a need for a complicated configuration in which the leading ends in the rotation direction of the dimples on the outer peripheral side are inclined toward the outer peripheral side and the leading ends in the rotation direction of the dimples on the inner peripheral side are inclined toward the inner peripheral side. Since a fluid concentrates on a radially center portion of the sliding surface, there is also a problem that the entire sliding surface cannot be uniformly lubricated.

The invention described in Patent Document 2 is just to randomly arrange the plural dimples in order to improve the lubricating property, and there is no examination on improvement in the sealing property.

By randomly arranging the plural dimples, a lubricating performance is improved in comparison to aligned arrangement. However, in random arrangement, an effect of suctioning a fluid to leak out to the low pressure fluid side, the so-called pumping effect is less easily obtained. Thus, there is a problem that leakage occurs. There is also a problem that as a result of random arrangement, it is unclear which arrangement influences the lubricating performance in what way.

A first object of the present invention is to provide sliding components excellent in a sealing property by finding out a relationship between a dimple arrangement characteristic and a pumping characteristic in a case where plural dimples are randomly arranged, and improving a characteristic of suctioning a fluid from the leakage side to sliding surfaces.

In addition to the first object, a second object of the present invention is to provide sliding components with which contradictory conditions of sealing and lubricating can be met by improving a characteristic of letting the fluid flow from the sealed fluid side to the sliding surfaces.

Solution to Problem

[Principle of the Prevent Invention]

The inventors of the present invention conducted numerical experiments of arrangement conditions of 200 cases by using experiment plans based on the Latin hypercube method in sliding components in which plural dimples are randomly arranged on sliding surfaces. As a result, the inventors obtained a finding that there is the following relationships between dimple arrangement and a pumping characteristic and a lubricating characteristic.

(1) A suction amount from the leakage side to the sliding surfaces (hereinafter, sometimes referred to as the pumping amount) correlates to an average value of coordinates of the dimples in the radial direction of the sliding surfaces (Spearman's rank-correlation coefficient of 0.672). As shown in FIG. 2A, when a radial-direction coordinate average value of centers of dimples forming a dimple group (indicating radial-direction gravity center of the dimple group) is smaller than a sliding radius (radial-direction center of the sliding surfaces), that is, when an average radial-direction coordinate rmean is smaller than 0.5, an amount of a fluid suctioned from the inner peripheral side of the sliding surfaces (leakage side) into the sliding surfaces is increased. The average radial-direction coordinate rmean of FIG. 2A is expressed by the following expression.

$r$mean=("average value of radial-direction coordinates of centers of dimples forming a dimple group"−"inside radius $Ri$ of sliding surfaces")/("outside radius $Ro$ of sliding surfaces"−"inside radius $Ri$ of sliding surfaces")

(2) Torque of the sliding surfaces that slide with respect to each other correlates to a standard deviation of angular-direction coordinates of dimples normalized by uniform distribution (hereinafter, referred to as the "angular-direction standard deviation $\sigma_\theta$" indicating a dispersion degree of a dimple group in the angular direction) (Spearman's rank-correlation coefficient of 0.595). As shown in FIG. 2B, when the angular-direction standard deviation $\sigma_\theta$ is smaller than one, more preferably, smaller than 0.8, no large torque is generated.

Based on the finding described above, the invention of the present application is to firstly improve a sealing property by arranging dimples in such a manner that a radial-direction coordinate average value of centers of the dimples is smaller than a sliding radius and improving a characteristic of suctioning from the leakage side to sliding surfaces, and secondly prevent generation of large torque by arranging dimples in such a manner that an angular-direction standard deviation $\sigma_\theta$ of the dimples is smaller than one, more preferably, smaller than 0.8 and improving a lubricating property.

Solution

To attain the above objects, sliding components according to a first aspect of the present invention are a pair of sliding components having annular sliding surfaces that slide with respect to each other in which plural dimples are arranged on at least the sliding surface on one side, characterized in that the plural dimples are randomly arranged to form a random dimple group, and the dimples are arranged in such a manner that a radial-direction coordinate average of centers of the dimples of the random dimple group is smaller than a sliding radius of the sliding surface.

According to the first aspect, it is possible to improve a characteristic of suctioning a fluid from the leakage side to the sliding surface. Thus, it is possible to provide the sliding components excellent in a sealing property.

According to a second aspect of the present invention, in the sliding components in the first aspect, plural random dimple groups are formed independently from each other in the circumferential direction of the sliding surface.

According to the second aspect, it is possible to improve the characteristic of suctioning the fluid from the leakage side to the sliding surface uniformly in the circumferential direction of the sliding surface.

According to a third aspect of the present invention, in the sliding components in the first or second aspect, the dimples are arranged in such a manner that an angular-direction standard deviation of the dimples of the random dimple group is less than one.

According to the third aspect, it is possible to improve a characteristic of letting the fluid flow from the sealed fluid side to the sliding surface and to obtain a thick liquid film. Thus, it is possible to provide the sliding components excellent in a lubricating property.

According to a fourth aspect of the present invention, in the sliding components in the first or second aspect, the dimples are arranged in such a manner that an angular-direction standard deviation of the dimples of the random dimple group is less than 0.8.

According to the fourth aspect, it is possible to furthermore improve the characteristic of letting the fluid flow from the sealed fluid side to the sliding surface and to obtain a thick liquid film. Thus, it is possible to provide the sliding components excellent in the lubricating property.

According to a fifth aspect of the present invention, in the sliding components in the third or fourth aspect, a pumping random dimple group in which the dimples are arranged in such a manner that the radial-direction coordinate average of the centers of the dimples of the random dimple group is smaller than the sliding radius of the sliding surface is arranged on the sliding surface on the leakage side, and a lubricating random dimple group in which the dimples are arranged in such a manner that the angular-direction standard deviation of the dimples of the random dimple group is at least less than one is arranged on the sliding surface on the sealed fluid side.

According to the fifth aspect, it is possible to improve the sealing property of the sliding surface and also furthermore improve the lubricating property.

According to a sixth aspect of the present invention, in the sliding components in the fifth aspect, a deep groove being isolated from the leakage side and communicating with the sealed fluid side is arranged on the sliding surface, and a circumferential deep groove of the deep groove is arranged between the pumping random dimple group and the lubricating random dimple group.

According to the sixth aspect, since the fluid can be supplied from the sealed fluid side to the sliding surface via the deep groove, it is possible to improve the lubricating property of the sliding surface. It is also possible to prevent contact between the pumping random dimple group and the lubricating random dimple group by the circumferential deep groove. Thus, it is possible to sufficiently exert functions of the pumping random dimple group and functions of the lubricating random dimple group.

Advantageous Effects of Invention

The present invention achieves the following outstanding effects.

(1) In the pair of sliding components having the annular sliding surfaces that slide with respect to each other in which the plural dimples are arranged on at least the sliding surface on one side, the plural dimples are randomly arranged to form the random dimple group, and the dimples are arranged in such a manner that the radial-direction coordinate average of the centers of the dimples of the random dimple group is smaller than the sliding radius of the sliding surface. Thereby, it is possible to improve the characteristic of suctioning the fluid from the leakage side to the sliding surface. Thus, it is possible to provide the sliding components excellent in the sealing property.

(2) The plural random dimple groups are formed independently from each other in the circumferential direction of the sliding surface. Thereby, it is possible to improve the characteristic of suctioning the fluid from the leakage side to the sliding surface uniformly in the circumferential direction of the sliding surface.

(3) The dimples are arranged in such a manner that the angular-direction standard deviation of the dimples of the random dimple group is less than one. Thereby, it is possible to improve the characteristic of letting the fluid flow from the sealed fluid side to the sliding surface and to obtain a thick liquid film. Thus, it is possible to provide the sliding components excellent in the lubricating property.

(4) The dimples are arranged in such a manner that an angular-direction standard deviation of the dimples of the random dimple group is less than 0.8. Thereby, it is possible to furthermore improve the characteristic of letting the fluid flow from the sealed fluid side to the sliding surface and to obtain a thick liquid film. Thus, it is possible to provide the sliding components excellent in the lubricating property.

(5) The pumping random dimple group in which the dimples are arranged in such a manner that the radial-direction coordinate average of the centers of the dimples of the random dimple group is smaller than the sliding radius of the sliding surface is arranged on the sliding surface on the leakage side, and the lubricating random dimple group in which the dimples are arranged in such a manner that the angular-direction standard deviation of the dimples of the random dimple group is at least less than one is arranged on the sliding surface on the sealed fluid side. Thereby, it is possible to improve the sealing property of the sliding surface and also furthermore improve the lubricating property.

(6) The deep groove being isolated from the leakage side and communicating with the sealed fluid side is arranged on the sliding surface, and the circumferential deep groove of the deep groove is arranged between the pumping random dimple group and the lubricating random dimple group. Thereby, since the fluid can be supplied from the sealed fluid side to the sliding surface via the deep groove, it is possible to improve the lubricating property of the sliding surface. It is also possible to prevent contact between the pumping random dimple group and the lubricating random dimple group by the circumferential deep groove. Thus, it is possible to sufficiently exert the functions of the pumping random dimple group and the functions of the lubricating random dimple group.

DESCRIPTION OF EMBODIMENTS

Hereinafter, with reference to the drawings, modes for carrying out this invention will be described as examples based on embodiments. However, the dimensions, the materials, the shapes, the relative arrangements, etc. of constituent components described in the embodiments are not intended to limit the scope of the present invention only to them unless otherwise described explicitly.

First Embodiment

Figure 1:
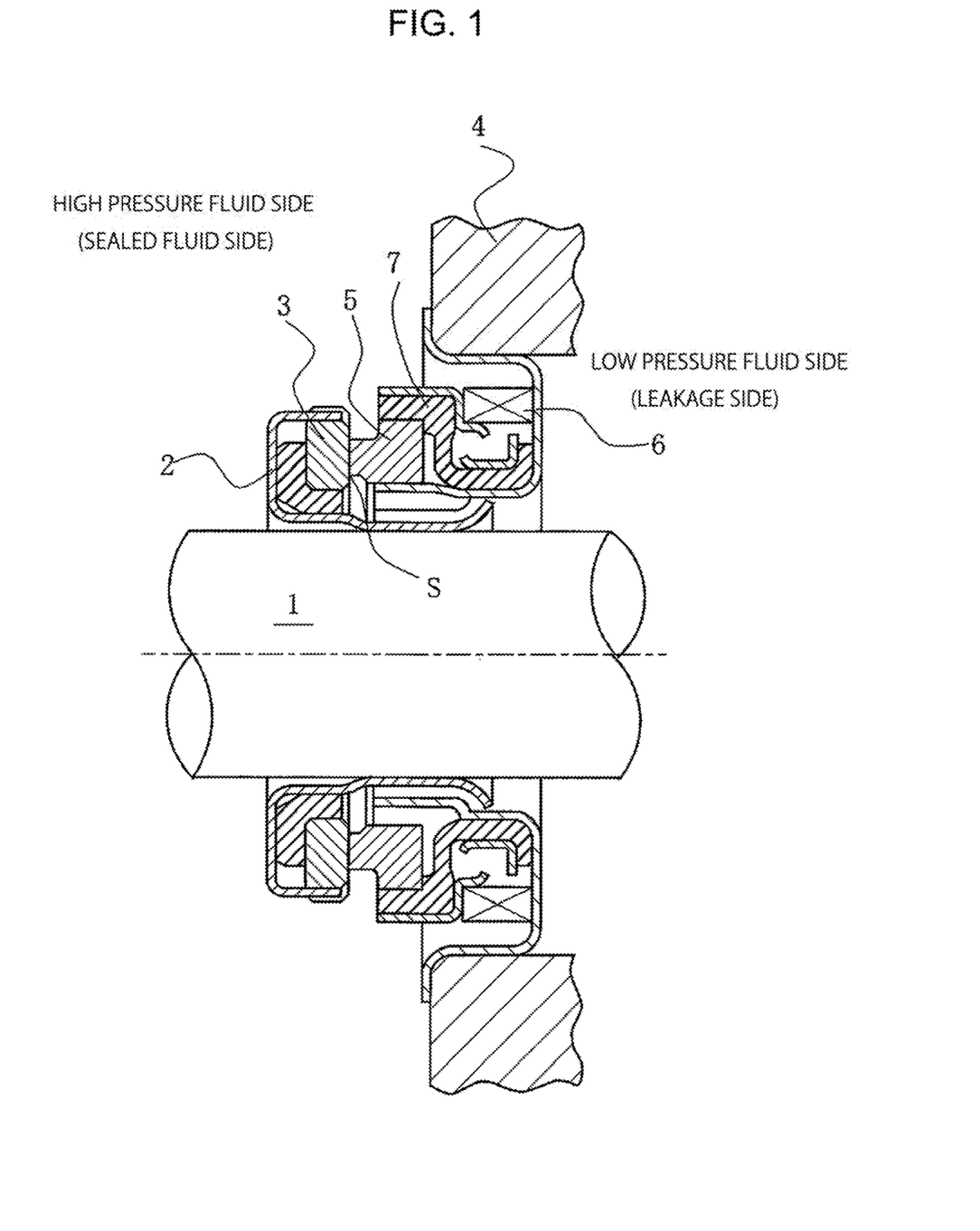
FIG. 1 is a vertically sectional view showing an example of a mechanical seal according to a first embodiment of the present invention.
Figure 2:
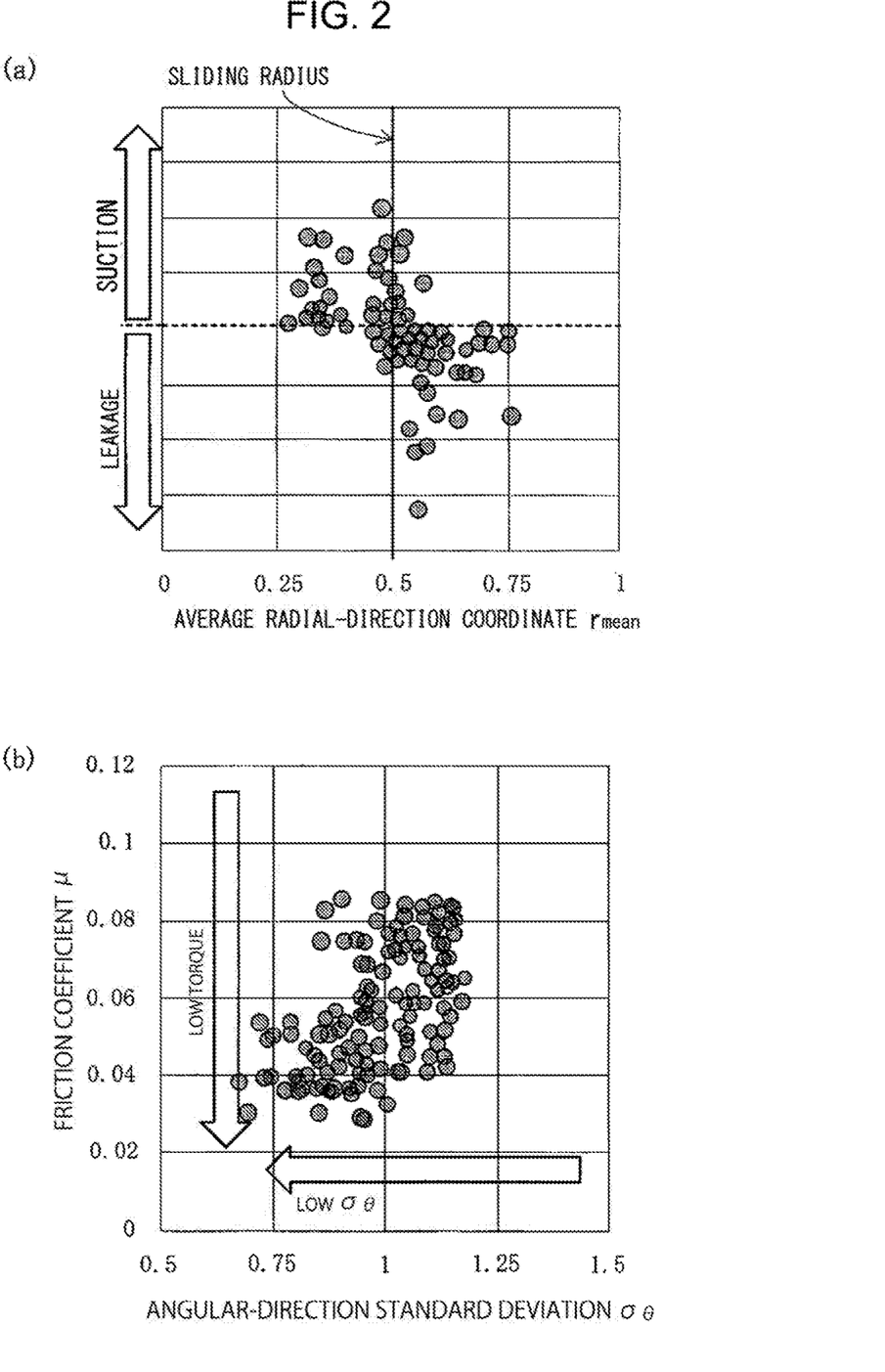
FIG. 2 is an illustrative view for illustrating the principle of the present invention.
Figure 3:
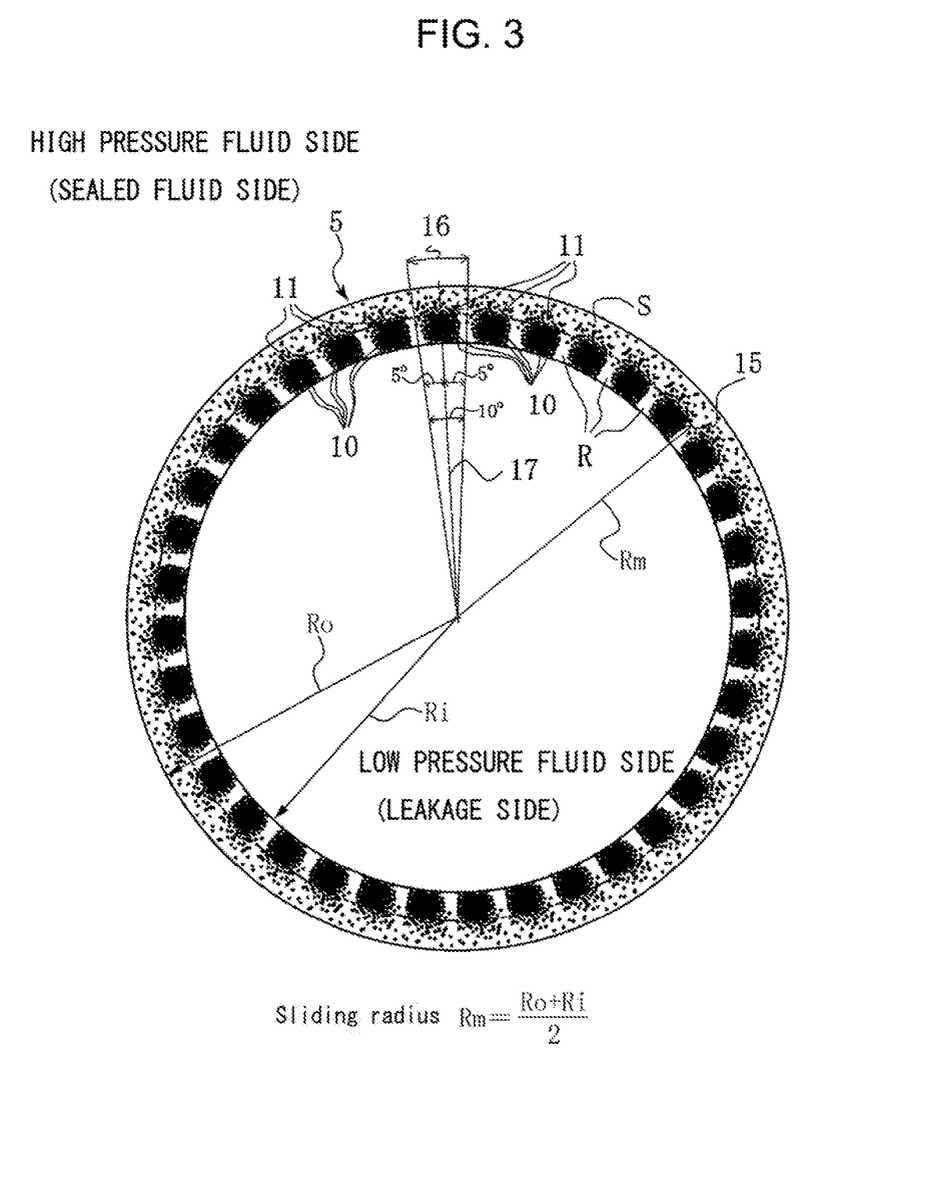
FIG. 3 is a plan view for illustrating an example of a sliding surface of a sliding component according to the first embodiment of the present invention.

With reference to FIGS. 1 to 3, sliding components according to a first embodiment of the present invention will be described.

In the following embodiment, as an example, a mechanical seal that is an example of the sliding components will be described. However, the present invention is not limited to this but for example can also be utilized as a sliding component of a bearing that slides with a rotating shaft while sealing lubricating oil on the axially one side of a cylindrical sliding surface.

The outer peripheral side of the sliding component forming the mechanical seal will be described as the high pressure fluid side (sealed fluid side), and the inner peripheral side as the low pressure fluid side (leakage side). However, the present invention is not limited to this but a case where the high pressure fluid side and the low pressure fluid side are reversed is also applicable.

FIG. 1 is a vertically sectional view showing an example of the mechanical seal, which is an inside mechanical seal in the form of sealing a sealed fluid on the high pressure fluid side to leak from the outer periphery of sliding surfaces toward the inner periphery. The mechanical seal is provided with an annular rotating side seal ring 3 serving as one sliding component provided across a sleeve 2 on the side of a rotating shaft 1 that drives a pump impeller (not shown) on the high pressure fluid side in a state where the rotating side seal ring is rotatable integrally with this rotating shaft 1, and an annular stationary side seal ring 5 serving as the other sliding component provided in a housing 4 of a pump in a non-rotating state and an axially movable state. With a coiled wave spring 6 and a bellows 7 axially biasing the stationary side seal ring 5, the seal rings slide in close contact with each other at sliding surfaces S. That is, this mechanical seal prevents an outflow of the sealed fluid from the outer peripheral side of the rotating shaft 1 to the inner peripheral side at the sliding surfaces S of the rotating side seal ring 3 and the stationary side seal ring 5.

FIG. 1 shows a case where width of the sliding surface of the rotating side seal ring 3 is greater than width of the sliding surface of the stationary side seal ring 5. However, the present invention is not limited to this but is also applicable to the opposite case as a matter of course.

The material of the rotating side seal ring 3 and the stationary side seal ring 5 is selected from silicon carbide (SiC) excellent in wear resistance, carbon excellent in self-lubricity, etc. For example, both the seal rings can be made of SiC or the rotating side seal ring 3 of SiC and the stationary side seal ring 5 of carbon can be combined.

Dimples are arranged on at least any one of the sliding surfaces of the rotating side seal ring 3 and the stationary side seal ring 5 that slide with respect to each other.

In the present invention, the "dimples" are dents formed on the flat sliding surface S, and the shape thereof is not particularly limited. For example, the planar shape of the dents includes a circle, an ellipse, an oval, or a rectangle. The sectional shape of the dents also includes various shapes such as a bowl shape or a square.

In order to reduce a friction coefficient of the sliding surface, it is desirable to activate in a fluid lubricating state. Due to the dent shape of the dimples, a fluid lubricating operation is obtained. A mechanism of fluid lubrication in the dimples is as follows.

When the opposing sliding surface is relatively moved, by the wedge operation of hole portions of the dimples, negative pressure is generated in a part on the upstream side of the hole portions, and positive pressure is generated in a part on the downstream side. At that time, in the negative pressure part on the upstream side of the hole portions, a liquid film is broken and a cavity is formed due to steam and bubbles of a liquid (cavitation), so that negative pressure is cancelled. As a result, only positive pressure remains and a load capacity is generated, and hence the sliding surface S is brought up. When the sliding surface S is brought up, a gap between the two sliding surfaces that slide with respect to each other is increased, and the fluid having a lubricating property flows into the sliding surfaces S, so that the fluid lubricating operation is obtained.

In the present embodiment, a case where plural dimples are randomly arranged on the sliding surface S of the stationary side seal ring 5 will be described. In this case, dimples may be provided or not provided in the rotating side seal ring 3.

Random arrangement indicates arrangement excluding aligned arrangement in which dimples are arranged on a regular basis, and does not include zig-zag arrangement.

In FIG. 3, plural dimples 10 are arranged on the sliding surface S of the stationary side seal ring 5. The plural dimples 10 are randomly arranged to form random dimple groups 11.

In a case of FIG. 3, thirty-six random dimple groups 11 are arranged at equal intervals independently from each other in the circumferential direction of the sliding surface S via land portions R. However, the present invention is not limited to thirty-six random dimple groups at equal intervals but the number of random dimple groups is only required to be one or more.

In each of the random dimple groups 11, the dimples are arranged in such a manner that an average value of radial-direction coordinates of centers of the dimples 10 forming the random dimple group 11 is smaller than a sliding radius 15 of the sliding surface S (radial-direction center of the sliding surface S shown by a double chain line), that is, in such a manner that an average radial-direction coordinate rmean is not more than 0.5. The sliding radius 15 is expressed as Rm=(Ro+Ri)/2, wherein Ro denotes an outside radius of the sliding surface and Ri denotes an inside radius of the sliding surface.

When the radial-direction coordinate average of the centers of the dimples 10 of the random dimple group 11 is smaller than the sliding radius 15 of the sliding surface S, an amount of the fluid suctioned from the inner peripheral side of the sliding surface S (leakage side) into the sliding surface is increased.

In the present invention, the random dimple group in which the dimples 10 are arranged in such a manner that the radial-direction coordinate average of the centers of the dimples 10 is smaller than the sliding radius 15 of the sliding surface S (radial-direction center of the sliding surface S shown by the double chain line) will be called as the "pumping random dimple group".

The dimples 10 of the pumping random dimple group are arranged as follows.

(1) The dimples 10 are regarded as point-mass electrons, and with Coulomb force acting between the electrons, the plural dimples 10 are randomly arranged by using software.

(2) Imaginary force is operated by software to intentionally provide bias, so that more dimples 10 are arranged on the inner diameter side of the sliding surface.

(3) With the coordinates of the biased dimples, the radial-direction coordinate average of the centers of the dimples 10 is calculated by using software.

(4) Whether or not the radial-direction coordinate average of the centers of the dimples 10 is smaller than the sliding radius 15 of the sliding surface S is confirmed.

(5) In a case where the radial-direction coordinate average of the centers of the dimples 10 is larger than the sliding radius 15 of the sliding surface S, the operation (2) described above is performed.

In the first embodiment shown in FIG. 3, further, in each of the random dimple groups 11, the dimples 10 are arranged in such a manner that an angular-direction standard deviation $\sigma_\theta$ of the dimples 10 is less than one.

The angular-direction standard deviation of less than one is expressed as the following expression 1.

$$\text{angular-direction standard deviation } \sigma_\theta = \text{"angular-direction standard deviation } \sigma \text{ of random dimple group"}/\text{"angular-direction standard deviation } \sigma_r \text{ of aligned dimple group of uniform arrangement"} < 1 \quad \text{Expression 1}$$

In the random dimple group 11, when the dimples are arranged in such a manner that the angular-direction standard deviation $\sigma_\theta$ is less than one, the lubricating property of the sliding surface S is improved, and generation of large torque (resistance of sliding) is prevented. When the dimples are arranged in such a manner that the angular-direction standard deviation $\sigma_\theta$ is less than 0.8, the lubricating property of the sliding surface S is furthermore improved.

In the present invention, the random dimple group in which the dimples are arranged in such a manner that the angular-direction standard deviation $\sigma_\theta$ is less than one will be called as the "lubricating random dimple group".

The random dimple groups 11 shown in FIG. 3 are the pumping random dimple groups in which the dimples are arranged in such a manner that the radial-direction coordinate average of the centers of the dimples 10 is smaller than the sliding radius 15 of the sliding surface S, and at the same time, the lubricating random dimple groups in which the dimples are arranged in such a manner that the angular-direction standard deviation $\sigma_\theta$ is less than one.

In the first embodiment shown in FIG. 3, the dimples 10 are arranged as follows, so that the angular-direction standard deviation $\sigma_\theta$ of the dimples 10 of the random dimple group 11 is less than one.

(1) In FIG. 3, the thirty-six random dimple groups 11 are arranged at equal intervals in the circumferential direction of the sliding surface S. Thus, first, the angular-direction standard deviation $\sigma_r$ of the aligned dimple group of the uniform arrangement in a case of thirty-six random dimple groups at equal intervals is determined. An angle of a section 16 of the aligned dimple group of the uniform arrangement in a case of thirty-six random dimple groups at equal intervals is 10°, and an equal position of the section 16 from a center position 17 is a position of 2.5°. Therefore, the angular-direction standard deviation $\sigma_r$ of the aligned dimple group of the uniform arrangement in a case of thirty-six random dimple groups at equal intervals is 2.5°.

(2) Next, in this state, imaginary force is operated by software to intentionally provide bias, so that more dimples 10 are arranged on the center position 17 side.

(3) With the coordinates of the biased dimples, an angular-direction standard deviation $\sigma$ of the random dimple group 11 is calculated by using software.

(4) Based on the expression 1 described above, whether or not the angular-direction standard deviation $\sigma_\theta$ of the random dimple group 11 obtained by normalizing the angular-direction standard deviation $\sigma$ of the random dimple group 11 with the angular-direction standard deviation $\sigma_r$ of the aligned dimple group is less than one is confirmed.

(5) In a case where the angular-direction standard deviation $\sigma_\theta$ of the random dimple group 11 is larger than one, the operation (2) described above is performed.

According to the above description, the sliding components according to the first embodiment of the present invention exert the following specifically remarkable effects.

(1) In the pair of sliding components having the annular sliding surfaces that slide with respect to each other in which the plural dimples are arranged on at least the sliding surface on one side, the plural dimples 10 are randomly arranged to form the random dimple group 11, and the dimples 10 are arranged in such a manner that the radial-direction coordinate average of the centers of the dimples 10 of the random dimple group 11 is smaller than the sliding radius 15 of the sliding surface S. Thereby, it is possible to improve a characteristic of suctioning the fluid from the leakage side to the sliding surface. Thus, it is possible to provide the sliding components excellent in the sealing property.

(2) The plural random dimple groups 11 are formed independently from each other in the circumferential direction of the sliding surface S. Thereby, it is possible to improve the characteristic of suctioning the fluid from the leakage side to the sliding surface uniformly in the circumferential direction of the sliding surface. At that time, the random dimple groups 11 adjacent to each other are arranged via the land portion R. Thus, it is possible to increase a dynamic pressure generation effect in the land portion R.

(3) The dimples 10 are arranged in such a manner that the angular-direction standard deviation $\sigma_\theta$ of the dimples 10 of the random dimple group 11 is less than one. Thereby, it is possible to improve a characteristic of letting the fluid flow from the sealed fluid side to the sliding surface and to obtain a thick liquid film. Thus, it is possible to provide the sliding components excellent in the lubricating property.

When the dimples 10 are arranged in such a manner that the angular-direction standard deviation $\sigma_\theta$ of the dimples 10 of the random dimple group 11 is less than 0.8, it is possible to furthermore improve the characteristic of letting the fluid flow from the sealed fluid side to the sliding surface. Thus, it is possible to provide the sliding components excellent in the lubricating property.

Second Embodiment

Figure 4:
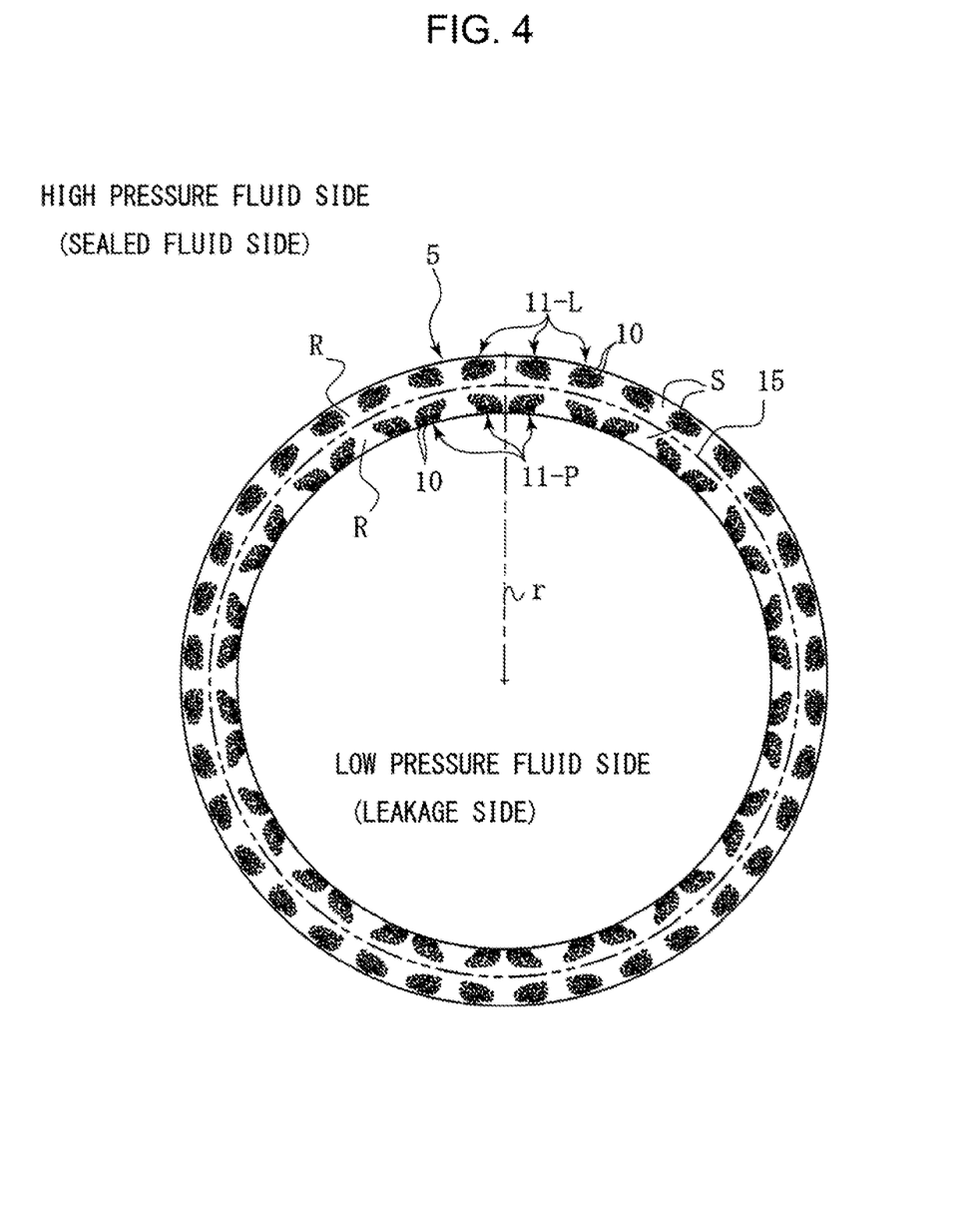
FIG. 4 is a plan view for illustrating an example of a sliding surface of a sliding component according to a second embodiment of the present invention.

With reference to FIG. 4, sliding components according to a second embodiment of the present invention will be described.

The sliding components according to the second embodiment are different from the sliding components of the first embodiment in a point that pumping random dimple groups and lubricating random dimple groups are partitioned from each other and arranged separately. However, the other basic configurations are the same as the first embodiment. The same members will be given the same reference signs and duplicated description will be omitted.

In FIG. 4, on a sliding surface S on the leakage side (inner peripheral side in FIG. 4), thirty-six pumping random dimple groups 11-P in which dimples 10 are arranged in such a manner that a radial-direction coordinate average of centers of the dimples 10 of the random dimple group 11 is smaller than a sliding radius 15 of the sliding surface S are arranged at equal intervals via land portions R. On a sliding surface S on the sealed fluid side (outer peripheral side in FIG. 4), thirty-six lubricating random dimple groups 11-L in which dimples 10 are arranged in such a manner that an angular-direction standard deviation of the dimples 10 of the random dimple group 11 is at least less than one are arranged at equal intervals via land portions R.

The pumping random dimple groups 11-P and the lubricating random dimple groups 11-L are not limited to thirty-six sections at equal intervals but the number is only required to be more than one and the random dimple groups do not have to be arranged at equal intervals.

In the present embodiment, the pumping random dimple groups 11-P having a large amount of suctioning from the leakage side to the sliding surface S are arranged on the leakage side of the sliding surface S and the lubricating random dimple groups 11-L with which the characteristic of letting the fluid flow to the sliding surface is improved and liquid film thickness is increased are arranged on the sealed fluid side. Thereby, it is possible to improve the sealing property and the lubricating property of the sliding surface S.

Regarding the pumping random dimple groups 11-P and the lubricating random dimple groups 11-L, the two adjacent dimple groups 11-P and the two adjacent dimple groups 11-L are respectively formed symmetrically with respect to a center line r passing through rotation center.

Therefore, even when the opposing sliding surface is rotated in any directions, similar functions can be exerted. Thus, it is regarded as a suitable shape for sliding components in which both sliding surfaces are rotated.

According to the above description, the sliding components according to the second embodiment of the present invention exert the following specifically remarkable effects.

(1) The pumping random dimple groups 11-P in which the dimples 10 are arranged in such a manner that the radial-direction coordinate average of the centers of the dimples of the random dimple group 11 is smaller than the sliding radius 15 of the sliding surface S are arranged on the sliding surface S on the leakage side (inner peripheral side in FIG. 4), and the lubricating random dimple groups 11-L in which the dimples 10 are arranged in such a manner that the angular-direction standard deviation of the dimples 10 of the random dimple group 11 is at least less than one are arranged on the sliding surface S on the sealed fluid side. Thereby, it is possible to improve the sealing property of the sliding surface S and also furthermore improve the lubricating property.

(2) The two adjacent dimple groups 11-P and the two adjacent dimple groups 11-L are respectively formed symmetrically with respect to the center line r passing through the rotation center. Thereby, it is possible to provide the sliding components favorable for sliding components in which both sliding surfaces are rotated.

Third Embodiment

Figure 5:
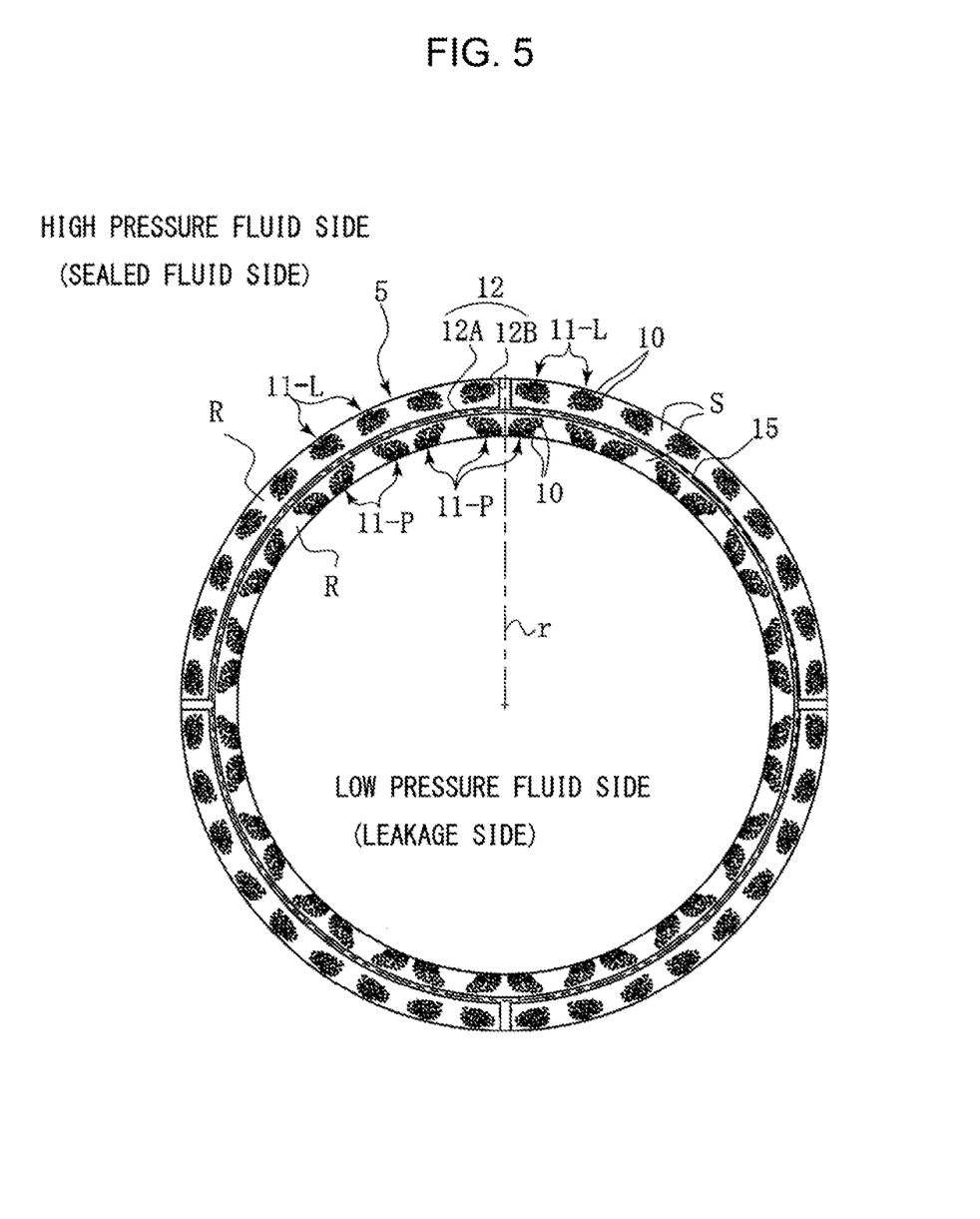
FIG. 5 is a plan view for illustrating an example of a sliding surface of a sliding component according to a third embodiment of the present invention.

With reference to FIG. 5, sliding components according to a third embodiment of the present invention will be described.

The sliding components according to the third embodiment are different from the sliding components of the second embodiment (FIG. 4) in a point that a deep groove 12 is provided. However, the other basic configurations are the same as the second embodiment. The same members will be given the same reference signs and duplicated description will be omitted.

In FIG. 5, thirty-six pumping random dimple groups 11-P are arranged at equal intervals on a sliding surface S on the leakage side (inner diameter side in FIG. 5), lubricating random dimple groups 11-L are arranged on a sliding surface S on the sealed fluid side (outer diameter side in FIG. 5). The deep groove 12 is arranged between the lubricating random dimple groups 11-L and the pumping random dimple groups 11-P.

The deep groove 12 is formed by a circumferential deep groove 12A and radial deep grooves 12B. The circumferential deep groove 12A is provided over the entire circumference of the sliding surface S, and the outer peripheral side and the inner peripheral side of the circumferential deep groove 12A are partitioned by the sliding surface S. Each of the radial deep grooves 12B has an opening portion open to the sealed fluid side on one side and communicates with the circumferential deep groove 12A on the other side. Thereby, the deep groove 12 is partitioned by the sliding surface S excluding the opening portions open to the sealed fluid side, and isolated from the leakage side.

The deep groove 12 has a function of supplying a fluid to the sliding surface S from the sealed fluid side to lubricate the sliding surface S, and also a function of blocking between a pumping region where the pumping random dimple groups 11-P are arranged and a liquid film holding region where the lubricating random dimple groups 11-L are arranged to exert effects of both the regions without destructing.

According to the above description, the sliding components according to the third embodiment of the present invention exert the following specifically remarkable effects.
(1) The deep groove 12 being isolated from the leakage side and communicating with the sealed fluid side is arranged on the sliding surface S, and the circumferential deep groove 12A of the deep groove 12 is arranged between the pumping random dimple groups 11-P and the lubricating random dimple group 11-L. Thereby, the fluid is supplied from the sealed fluid side to the sliding surface S and it is possible to improve the lubricating property of the sliding surface S. It is also possible to prevent contact between the pumping random dimple groups 11-P and the lubricating random dimple groups 11-L. Thus, it is possible to sufficiently exert the functions of the pumping random dimple groups 11-P and the functions of the lubricating random dimple groups 11-L.
(2) Roles of the pumping random dimple groups 11-P and the lubricating random dimple groups 11-L are separated from each other. Thus, it is possible to make design of the sliding components easier.

Fourth Embodiment

Figure 6:
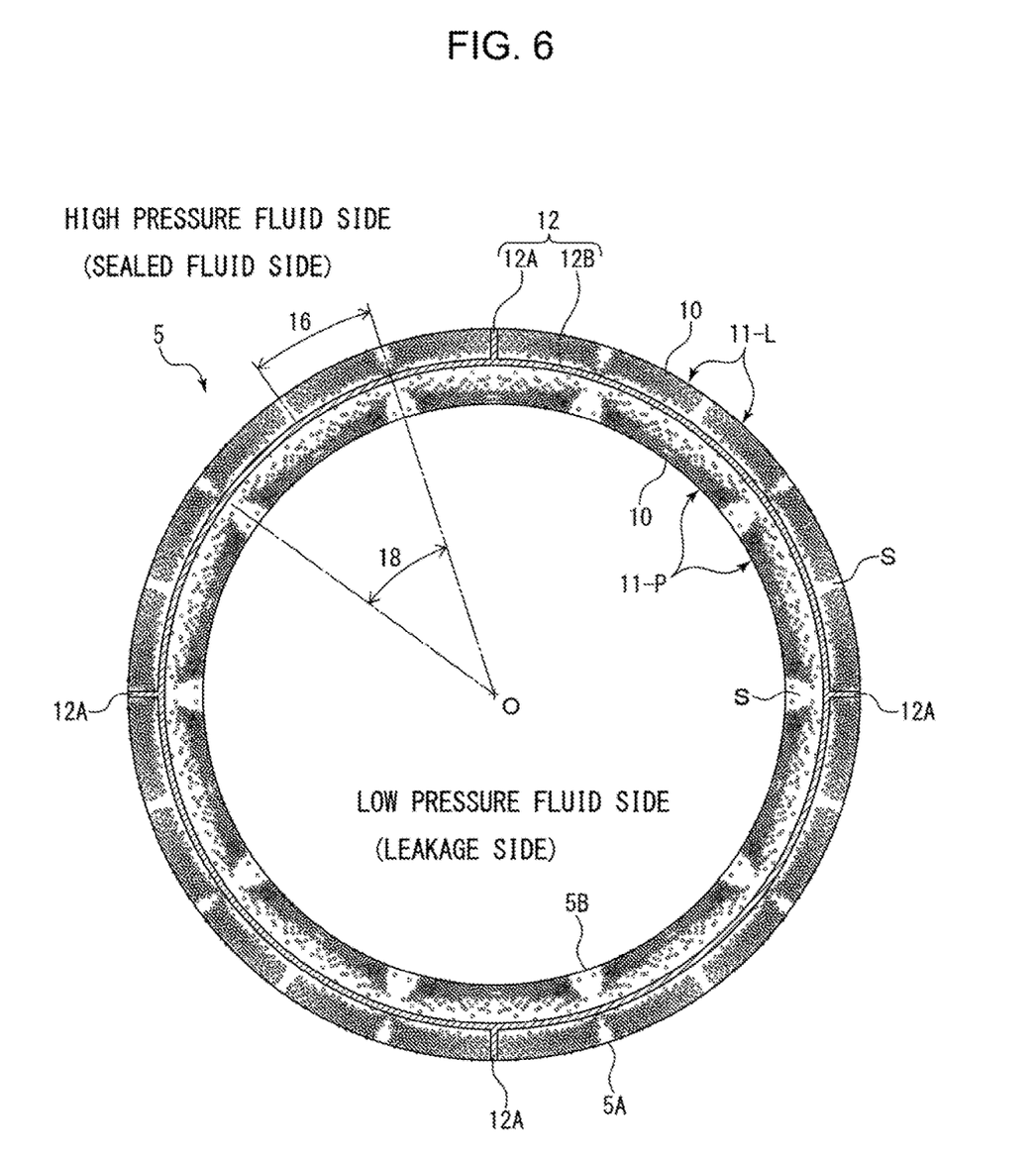
FIG. 6 is a plan view for illustrating an example of a sliding surface of a sliding component according to a fourth embodiment of the present invention.

With reference to FIG. 6, sliding components according to a fourth embodiment of the present invention will be described.

The sliding components according to the fourth embodiment are different from the sliding components of the third embodiment (FIG. 5) in a point that substantially twenty lubricating random dimple groups 11-L are arranged at equal intervals on a sliding surface S on the sealed fluid side (outer diameter side in FIG. 6) and substantially ten pumping random dimple groups 11-P are arranged at equal intervals on the leakage side (inner diameter side in FIG. 6), and the number of the lubricating random dimple groups 11-L is different from the number of the pumping random dimple groups 11-P. However, the other basic configurations are the same as the third embodiment. The same members will be given the same reference signs and duplicated description will be omitted.

In FIG. 6, a sliding surface S on the leakage side (inner diameter side in FIG. 6) is partitioned into substantially ten sections at equal intervals, and the pumping random dimple group 11-P is arranged in each of the sections 18. Dimples 10 of the pumping random dimple group 11-P are in direct contact with an inner peripheral portion 5B (leakage side) to form opening portions, suction a fluid to the sliding surface from the leakage side, and improve the sealing property of the sliding component. The sliding surface S on the sealed fluid side (outer diameter side in FIG. 6) is partitioned into substantially twenty sections at equal intervals, and the lubricating random dimple group 11-L is arranged in each of the sections 16. Dimples 10 of the lubricating random dimple group 11-L are in direct contact with an outer peripheral portion 5A of the sliding surface S (sealed fluid side) to form opening portions, improve the characteristic of letting the fluid flow from the sealed fluid side to the sliding surface, form a thick liquid film, and improve the lubricating property of the sliding component. In the fourth embodiment, the sliding surface S on the leakage side is partitioned into the substantially ten sections at equal intervals and the sliding surface S on the sealed fluid side is partitioned into the substantially twenty sections at equal intervals. However, the number of sections is not limited to this but may be the other numbers.

A deep groove 12 is arranged between the pumping random dimple groups 11-P and the lubricating random dimple groups 11-L. The deep groove 12 is formed by a circumferential deep groove 12A and radial deep grooves 12B. The circumferential deep groove 12A is provided over the entire circumference of the sliding surface S, and the outer peripheral side and the inner peripheral side of the circumferential deep groove 12A are partitioned by the sliding surface S. Each of the radial deep grooves 12B has an opening portion open to the sealed fluid side on one side and communicates with the circumferential deep groove 12A on the other side. Thereby, the deep groove 12 is partitioned by the sliding surface S excluding the opening portions open to the sealed fluid side, and isolated from the leakage side.

The deep groove 12 has a function of supplying the fluid to the sliding surface S from the sealed fluid side to lubricate the sliding surface S, and also a function of blocking between a pumping region where the pumping random dimple groups 11-P are arranged and a liquid film holding region where the lubricating random dimple groups 11-L are arranged to exert effects of both the regions without destructing.

According to the above description, the sliding components according to the fourth embodiment of the present invention exert the following specifically remarkable effects.
(1) The deep groove 12 being isolated from the leakage side and communicating with the sealed fluid side is arranged on the sliding surface S, and the circumferential deep groove 12A of the deep groove 12 is arranged between the pumping random dimple groups 11-P and the lubricating random dimple group 11-L. Thereby, the fluid is supplied from the sealed fluid side to the sliding surface S and it is possible to improve the lubricating property of the sliding surface S. It is also possible to prevent contact between the pumping random dimple groups 11-P and the lubricating random dimple groups 11-L. Thus, it is possible to sufficiently exert the functions of the pumping random dimple groups 11-P and the functions of the lubricating random dimple groups 11-L.
(2) The pumping random dimple groups 11-P and the lubricating random dimple groups 11-L which are the dimple groups having different roles can be freely arranged on the outer diameter side and on the inner diameter side. Thus, it is possible to make the design of the sliding components easier.

The modes in which the present invention is implemented are described with the embodiments above. Specific configurations are not limited to the modes of these embodiments but the present invention also includes changes and additions within the range not departing from the gist of the present invention.

For example, in the above embodiments, the example in which the sliding component is used for any one of the pair of the rotating side seal ring and the stationary side seal ring in the mechanical seal device is described. However, the sliding component can also be utilized as a sliding component of a bearing to slide with a rotating shaft while sealing lubricating oil on the axially one side of a cylindrical sliding surface.

For example, in the above embodiments, the case where the high-pressure sealed fluid exists on the outer peripheral side is described. However, the present invention can also be utilized for a case where a high-pressure fluid exists on the inner peripheral side.

For example, in the above embodiments, the thirty-six pumping random dimple groups and the thirty-six lubricating random dimple groups are arranged at equal intervals. However, the present invention is not limited to this but the number of the random dimple groups is only required to be one or more and the random dimple groups do not have to be arranged at equal intervals.

REFERENCE SIGNS LIST 1 rotating shaft
2 sleeve
3 rotating side seal ring
4 housing
5 stationary side seal ring
6 coiled wave spring
7 bellows
10 dimple
11 random dimple group
11-P pumping random dimple group
11-L lubricating random dimple group
12 deep groove
12A circumferential deep groove
12B radial deep groove
15 sliding radius
16 section
17 center position of section
S sliding surface
R land region

The invention claimed is:

1. A pair of sliding components having annular sliding surfaces that have a leakage side and a sealed fluid side and slide with respect to each other in which plural dimples are arranged on at least the sliding surface on one side, characterized in that the plural dimples are randomly arranged to form at least one random dimple group, and the dimples are arranged in such a manner that a radial-direction coordinate average of centers of the dimples of the random dimple group is smaller than a sliding radius of the sliding surface.

2. The sliding components according to claim 1, characterized in that plural random dimple groups are formed independently from each other in the circumferential direction of the sliding surface via a land portion.

3. The sliding components according to claim 2, characterized in that the dimples are arranged in such a manner that an angular-direction standard deviation of the dimples of the random dimple group is less than one.

4. The sliding components according to claim 2, characterized in that the dimples are arranged in such a manner that an angular-direction standard deviation of the dimples of the random dimple group is less than 0.8.

5. The sliding components according to claim 4, characterized in that the at least one random dimple group is comprised of at least one pumping random dimple group which is arranged on the sliding surface on the leakage side, and, in addition to the at least one pumping random dimple group, at least one lubricating random dimple group, in which dimples are arranged in such a manner that an angular-direction standard deviation of the dimples is at least less than one, is arranged on the sliding surface on the sealed fluid side.

6. The sliding components according to claim 5, characterized in that a deep groove being isolated from the leakage side and communicating with the sealed fluid side is arranged on the sliding surface, and a circumferential deep groove of the deep groove is arranged between the pumping random dimple group and the lubricating random dimple group.

7. The sliding components according to claim 2, characterized in that the at least one random dimple group is comprised of at least one pumping random dimple group which is arranged on the sliding surface on the leakage side, and, in addition to the at least one pumping random dimple group, at least one lubricating random dimple group, in which dimples are arranged in such a manner that an angular-direction standard deviation of the dimples is at least less than one, is arranged on the sliding surface on the sealed fluid side.

8. The sliding components according to claim 7, characterized in that a deep groove being isolated from the leakage side and communicating with the sealed fluid side is arranged on the sliding surface, and a circumferential deep groove of the deep groove is arranged between the pumping random dimple group and the lubricating random dimple group.

9. The sliding components according to claim 1, characterized in that the dimples are arranged in such a manner that an angular-direction standard deviation of the dimples of the random dimple group is less than one.

10. The sliding components according to claim 1, characterized in that the dimples are arranged in such a manner that an angular-direction standard deviation of the dimples of the random dimple group is less than 0.8.

11. The sliding components according to claim 10, characterized in that the at least one random dimple group is comprised of at least one pumping random dimple group which is arranged on the sliding surface on the leakage side, and, in addition to the at least one pumping random dimple group, at least one lubricating random dimple group, in which dimples are arranged in such a manner that an angular-direction standard deviation of the dimples is at least less than one, is arranged on the sliding surface on the sealed fluid side.

12. The sliding components according to claim 11, characterized in that a deep groove being isolated from the leakage side and communicating with the sealed fluid side is arranged on the sliding surface, and a circumferential deep groove of the deep groove is arranged between the pumping random dimple group and the lubricating random dimple group.

13. The sliding components according to claim 1, characterized in that the at least one random dimple group is comprised of at least one pumping random dimple group which is arranged on the sliding surface on the leakage side, and, in addition to the at least one pumping random dimple group, at least one lubricating random dimple group, in which dimples are arranged in such a manner that an angular-direction standard deviation of the dimples is at least less than one, is arranged on the sliding surface on the sealed fluid side.

14. The sliding components according to claim 13, characterized in that a deep groove being isolated from the leakage side and communicating with the sealed fluid side is arranged on the sliding surface, and a circumferential deep groove of the deep groove is arranged between the pumping random dimple group and the lubricating random dimple group.

* * * * *